United States Patent
Moon et al.

(10) Patent No.: US 7,471,641 B2
(45) Date of Patent: Dec. 30, 2008

(54) TRANSMISSION CONTROLLER, WIRELESS BASE STATION, AND METHOD OF CONTROLLING TRANSMISSION RATE

(75) Inventors: Sung Uk Moon, Yokosuka (JP); Takehiro Nakamura, Yokosuka (JP); Minami Ishii, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 612 days.

(21) Appl. No.: 10/821,918

(22) Filed: Apr. 12, 2004

(65) Prior Publication Data

US 2004/0202113 A1   Oct. 14, 2004

(30) Foreign Application Priority Data

Apr. 14, 2003   (JP)   ............... 2003-109352

(51) Int. Cl.
*H04Q 7/20* (2006.01)
(52) U.S. Cl. ................ 370/252; 370/329; 455/522; 455/67.13
(58) Field of Classification Search ............ 455/69, 455/522, 127.2, 226.1, 226.2, 226.3, 63.1, 455/67.11, 67.13; 370/252, 329
See application file for complete search history.

(56) References Cited

U.S. PATENT DOCUMENTS

| | | | | |
|---|---|---|---|---|
| 5,483,676 A * | 1/1996 | Mahany et al. | ............ | 455/67.14 |
| 5,825,761 A * | 10/1998 | Tanaka et al. | ............ | 370/333 |
| 6,738,646 B2 * | 5/2004 | Miyoshi et al. | ............ | 455/561 |
| 6,973,289 B2 * | 12/2005 | Ue et al. | ............ | 455/69 |
| 6,999,764 B2 * | 2/2006 | Kikuma et al. | ............ | 455/436 |
| 7,339,898 B2 * | 3/2008 | Lee | ............ | 370/252 |
| 2001/0038630 A1 | 11/2001 | Tong et al. | | |
| 2001/0040881 A1 | 11/2001 | Ayyagari et al. | | |
| 2002/0183084 A1 | 12/2002 | Wu et al. | | |
| 2003/0083088 A1 * | 5/2003 | Chang et al. | ............ | 455/522 |
| 2005/0128976 A1 * | 6/2005 | Uehara et al. | ............ | 370/329 |

FOREIGN PATENT DOCUMENTS

| | | |
|---|---|---|
| EP | 1 122 965 A1 | 8/2001 |
| JP | 11-331936 | 11/1999 |
| JP | 2000-217143 | 8/2000 |
| JP | 2001-189693 | 7/2001 |

(Continued)

OTHER PUBLICATIONS

Hans Kröner, "Radio Resource Allocation for Data Services in UMTS Networks", AEÜ International Journal of Electronics and Communications, vol. 55, No. 1, 2001, pp. 55-62.

(Continued)

*Primary Examiner*—Blane J Jackson
(74) *Attorney, Agent, or Firm*—Oblon, Spivak, McClelland, Maier & Neustadt, P.C.

(57) ABSTRACT

A transmission controller which controls downlink transmission rates of multiple communications terminals based on corresponding downlink transmission qualities of the communications terminals is disclosed. The controller includes a transmission-quality obtaining unit configured to obtain the downlink transmission qualities of the communications terminals. A communications-terminal selecting unit is configured to select out of the communications terminals one which has the need to change the downlink transmission rate in accordance with the downlink transmission qualities obtained at the transmission-quality obtaining unit. A transmission-rate changing unit changes the downlink transmission rate of the communications terminal selected at the communications-terminal selecting unit.

11 Claims, 6 Drawing Sheets

FOREIGN PATENT DOCUMENTS

| | | |
|---|---|---|
| JP | 2001-309417 | 11/2001 |
| JP | 2002-539692 | 11/2002 |
| JP | 2003-23395 | 1/2003 |
| WO | WO 00/54531 A1 | 9/2000 |
| WO | WO 02/45362 A2 | 6/2002 |

OTHER PUBLICATIONS

3GPP TS 25.214 V5.2.0, Technical Specification, pp. 1-62, "3$^{RD}$ Generation Partnership Project: Technical Specification Group Radio Access Network; Physical Layer Procedures (FDD)", Sep. 2002.

* cited by examiner

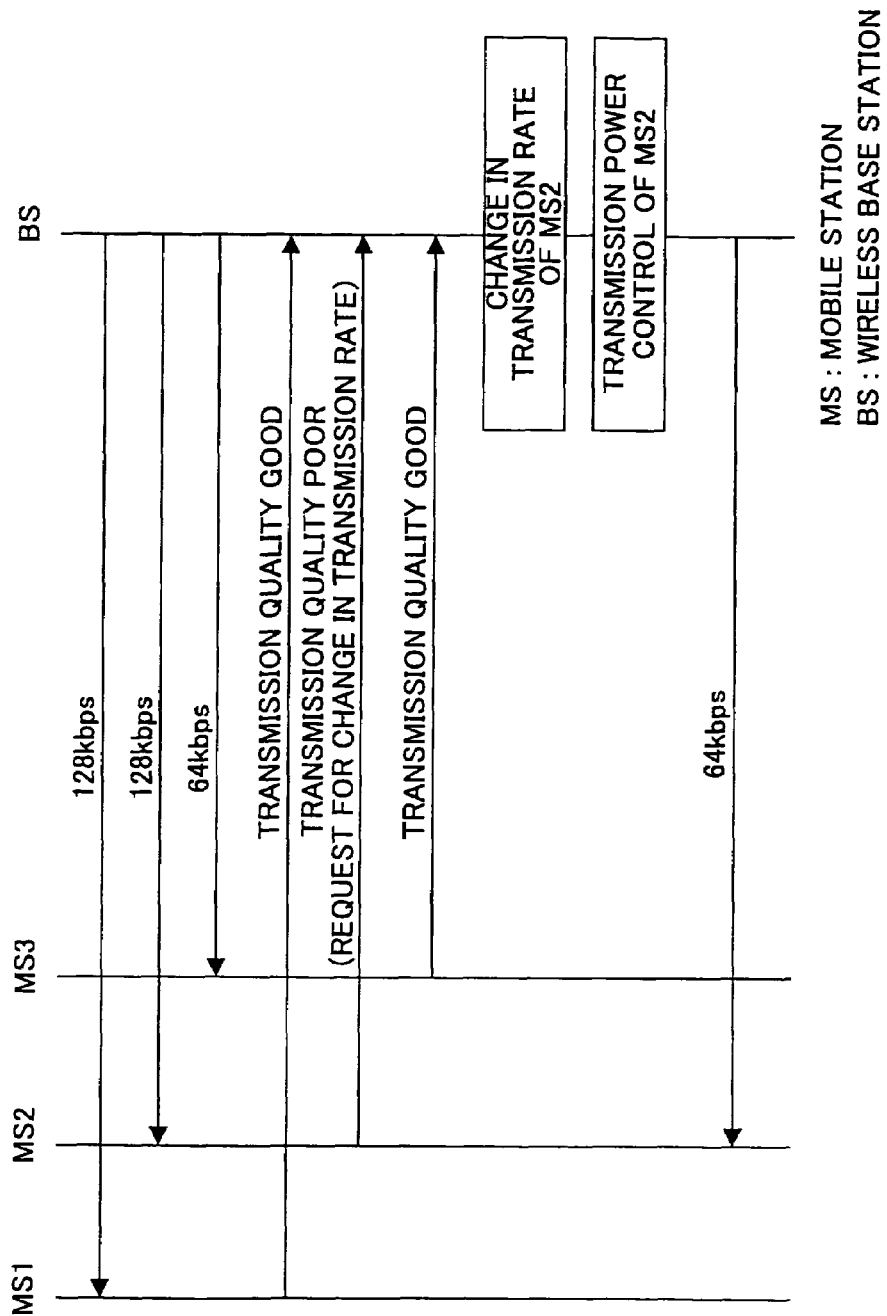

UP LINK

DOWN LINK

TRANSMISSION CONTROLLER, WIRELESS BASE STATION, AND METHOD OF CONTROLLING TRANSMISSION RATE

BACKGROUND OF THE INVENTION

1. Field of the Invention

The present invention generally relates to a transmission controller, a wireless base station and a method of controlling a transmission rate, and particularly relates to a transmission controller, a wireless base station and a method of controlling a transmission rate, in which a downlink transmission rate of a mobile station is controlled based on downlink transmission quality.

2. Description of the Related Art

In the WCDMA (Wideband Code Division Multiple Access) method being adopted in third generation mobile communications systems, a communications channel engaging in communications receives interference (Multiple Access Interference: MAI) from other communications channels and interference from multi-paths in the communications channel itself (Multi-Path Interference). A mobile communications system to which this WCDMA method is applied is a system in which such interference as described above limits the subscriber capacity of the system. Therefore, transmitting with the least power possible while allowing each individual channel to achieve predetermined quality enables an increase of the wireless circuit capacity.

In the current WCDMA method, a transmission power control method which enables an increase of the wireless circuit capacity by maintaining the transmission power to a necessary minimum is used, the transmission power control method further accounting for conserving power.

The transmission power control method used in the WCDMA method may be categorized into open-loop transmission power control (open-loop power control) and closed-loop transmission power control (closed-loop power control).

(Open-Loop Transmission Power Control)

In a mobile communications system, an uplink common-control channel is not a channel used in a pair of uplink and downlink circuits, so that applying closed-loop control is not possible. Therefore, open-loop transmission power control is used. In a mobile station, the downlink propagation loss using a downlink common-control channel is estimated so that uplink transmission power is determined based on that estimated value. Also for each individual channel to which closed-loop transmission power control is applied, an initial transmission power setting is usually determined using the open-loop.

(Closed-Loop Transmission Power Control)

FIG. 6A and FIG. 6B illustrate the concept of closed-loop transmission power control of the uplink and downlink circuits. FIG. 6A illustrates the concept of uplink closed-loop transmission power control, while FIG. 6B illustrates the concept of downlink closed-loop transmission power control. In closed-loop transmission power control, for both the uplink and downlink circuits, a measurement at the receiving side (a wireless base station $30$, $40$, or a mobile station $15$, $16$) of the quality of the communications channel is performed and a transmission power control (TPC) bit is transmitted using a return channel (or a control channel of layer 1 transmitted with a communications channel) so that a communications channel receiving transmission fulfills a desired quality. In other words, when a quality value of the communications channel measured as described above is greater than a target value, a transmission-power control bit (UP) which raises the transmission power is transmitted, whereas, when the quality value measured is less than the target value, a transmission-power control bit (Down) which lowers the transmission power is transmitted. Then, the mobile station and the wireless base station which receive the transmission-power control bit as described above change the transmission power based on that received transmission power control bit.

FIG. 7 is a receiving-block diagram of dual closed-loop control applied to a wireless base station and a mobile station using the WCDMA method. This dual closed-loop control consists of 2-stage loops of 1) inner-loop control and 2) outer-loop control. Below, operations of 1) the inner-loop control and 2) the outer-loop control are described.

(Inner-Loop Control)

In the inner-loop transmission power control of an uplink (or a downlink) communications channel, in a wireless base station (or a mobile station) a received baseband signal is despread at a despreading section $51$ and Rake-received at a Rake receiver $52$ so as to have the received SIR (Signal-to-Interference Ratio) measured at a SIR-measuring section $53$. Then, the received SIR measured and a target SIR from a target SIR section $55$ are compared at a comparative-decision section $54$ so that, at a TPC-bit generating section $56$, for a received SIR measured below the target SIR an "UP" command, and for the received SIR measured equal to or above the target SIR a "DOWN" command, is generated as a TPC bit so as to be mapped to a transmitting-side control channel and transmitted. At a mobile station (or a wireless base station), the TPC bit is received so as to cause a change of the transmission power by 1 dB based on the decoded result. Such closed-loop transmission power control is performed every slot period (0.667 ms).

(Outer-Loop Transmission Power Control)

In the inner-loop control as described above, while control so as to cause the received SIR of the communications channel to be a certain target value is performed, in the outer-loop control, a target SIR is controlled so as to cause the communications quality (for example, BER: Bit Error Rate, BLER: Block Error Rate, or FER: Frame Error Rate) to be a certain target value. More specifically, at a long-term quality measuring section $57$, the communications quality as described above is measured for a certain long term (from a few 100 milliseconds to a few seconds) so that the measured value and a target quality value from a target quality section $58$ are compared at a comparative decision section $59$. At a target SIR section $55$, based on the comparative decision result of a comparative decision section $59$, a target SIR is set so as to cause the communications quality as described above to be the target quality.

Thus, in the related art, the transmission power is controlled in accordance with the dual closed-loop control method.

Furthermore, there exists a method of appropriately controlling a transmission rate depending on the circuit state so as to enable appropriate control of the transmission power of a wireless base station relative to a mobile station (for example, refer to Patent Document 1).

Patent Document 1

JP2003-023395A

Non-Patent Document 1

$3^{rd}$ Generation Partnership Project Technical Specification Group Radio Access Network, 23.214 Physical layer procedure (FDD), September, 2002.

As described above, in the mobile communications system based on the CDMA method, the transmission power control which maintains the receiving quality to a predetermined quality is mandatory. On the other hand, changing transmission channel characteristics causing a degradation in the transmission quality (or a degradation of the propagation environment) causes the transmission power value necessary to fulfill a predetermined receiving quality to be increased to a predetermined value (or the maximum transmission power) so that a further raising of the transmission power is not possible when the predetermined value is reached. Therefore, while in the related art, control is performed in whereby the downlink transmission rate is lowered so that the transmission power capacity of a wireless base station is not exceeded, in such a case, there is a problem in that the processing burden at the time of the transmission rate control becomes large when simultaneously controlling all mobile stations requiring control.

Furthermore, in the method of controlling the transmission rate as described in Patent Document 1, the fact that a control process to lower the transmission rate at the time of a poor circuit state is performed, thereby causing appropriate control of the transmission power of a wireless base station relative to a mobile station, is disclosed. However, this related-art method does not reduce the processing burden at the time of controlling the transmission rate.

SUMMARY OF THE INVENTION

It is a general object of the present invention to provide a transmission controller, a wireless base station and a method of controlling a transmission rate, that substantially obviate one or more problems caused by the limitations and disadvantages of the related art.

In light of the problems as described above, it is a more particular object of the present invention to provide a transmission controller, a wireless base station and a method of controlling transmission rate, that enable a reduction of the processing burden at the time of controlling a downlink transmission rate of a mobile station even when the transmission power increases due to a degrading propagation environment and the like.

According to the invention, a transmission controller which controls multiple downlink transmission rates corresponding to multiple communications terminals based on multiple downlink transmission qualities corresponding to the communications terminals includes a transmission-quality obtaining unit configured to obtain the downlink transmission qualities of the communications terminals, a communications-terminal selecting unit configured to select out of the communications terminals one or more communications terminals which cause to change corresponding one or more downlink transmission rates in accordance with the downlink transmission qualities obtained at the transmission-quality obtaining unit, and a transmission-rate changing unit which causes to change one or more downlink transmission rates corresponding to one or more communications terminals selected at the communications-terminal selecting unit.

The transmission controller in an embodiment of the invention enables a reducing of the processing burden when controlling the transmission rate so as to facilitate a control of other parameters.

According to another aspect of the invention, a wireless base station which controls multiple downlink transmission rates corresponding to multiple mobile stations based on multiple downlink transmission qualities corresponding to the mobile stations includes a transmission-quality obtaining unit configured to obtain the downlink transmission qualities of the mobile stations, a mobile-station selecting unit configured to select out of the mobile stations one or more mobile stations which cause to change corresponding one or more downlink transmission rates in accordance with downlink transmission qualities obtained at the transmission-quality obtaining unit, and a transmission-rate changing unit which causes to change one or more downlink transmission rates corresponding to one or more mobile stations selected at the mobile-station selecting unit.

The wireless base station in an embodiment of the invention enables a reduction of the processing burden when controlling the transmission rate so as to facilitate control of other parameters.

According to another aspect of the invention, a method of controlling transmission rates which controls multiple downlink transmission rates corresponding to multiple communications terminals based on multiple downlink transmission qualities corresponding to the communications terminals includes the steps of, obtaining the downlink transmission qualities of the communications terminals, comparing corresponding values of the downlink transmission qualities obtained with a predetermined quality, selecting, when at least one of the downlink transmission qualities is determined to fall below a predetermined quality, as one or more communications terminals which cause to change corresponding one or more downlink transmission rates, at least one communications terminal out of the communications terminals with corresponding downlink transmission quality falling below the predetermined quality, and changing the downlink transmission rate of the at least one communications terminal selected.

The method of controlling transmission rates in an embodiment of the invention enables a reduction of the processing burden when controlling the transmission rates so as to facilitate control of other parameters.

Other objects and further features of the present invention will be apparent from the following detailed description when read in conjunction with the accompanying drawings.

BRIEF DESCRIPTION OF THE DRAWINGS

FIG. 5 is a sequence diagram illustrating a transmission-rate control process according to an embodiment 3 of the present invention;

DETAILED DESCRIPTION OF PREFERRED EMBODIMENTS

In the following, embodiments of the present invention are described with reference to the accompanying drawings.

Figure 1:
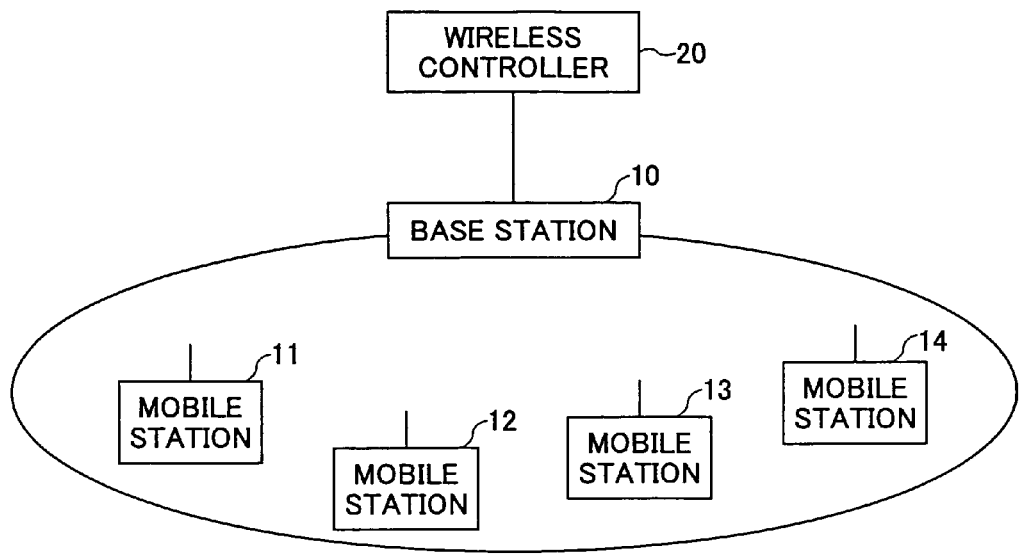
FIG. 1 is a block diagram of a mobile communications system to which a method of controlling a transmission rate according to an embodiment 1 of the present invention is applied.

FIG. 1 is a block diagram of a mobile communications system to which a method of controlling a transmission rate according to an embodiment 1 of the present invention is applied.

In FIG. 1, this mobile communications system consists of a wireless base station 10, multiple mobile stations 11 through 14 residing in an area of the wireless base station 10, and a wireless controller 20 controlling the wireless base station 10 as described above. For each of the mobile stations 11 through 14 as described above, transmission power control is performed between the wireless base station 10 and the wireless controller 20.

Figure 2:
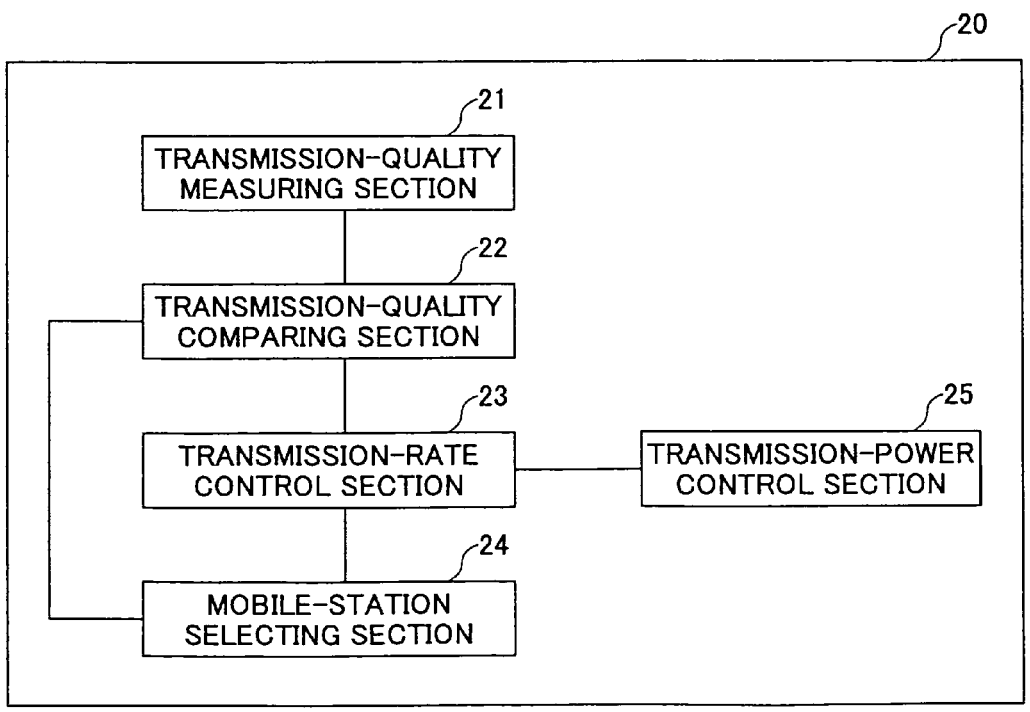
FIG. 2 is a functional block diagram illustrating a configuration of a wireless controller according to the embodiment 1 of the present invention.

FIG. 2 is a functional block diagram illustrating a configuration of the wireless controller 20 according to the embodiment 1 of the present invention.

In FIG. 2, this wireless controller 20 consists of a transmission-quality measuring section 21, a transmission-quality comparing section 22, a transmission-rate control section 23, a mobile-station selecting section 24, and a transmission-power control section 25.

The transmission-quality measuring section 21, based on measured information of the transmission quality received from a mobile station (for example, a Signal-to-Noise Ratio, a received power level, a Signal-to-Interference Ratio, a signal-error rate), obtains the downlink transmission quality. The transmission-quality comparing section 22 compares a predetermined quality value with a measured value of the downlink transmission quality which is sent from the transmission-quality measuring section 21 so as to send the comparison result to the mobile-station selecting section 24. The mobile-station selecting section 24, from the result as described above, selects, based on predetermined criteria, a mobile station to be the target for controlling the transmission rate, from mobile stations having reported the fact that the downlink transmission quality is less than or equal to the predetermined quality, so as to report that selected result to the transmission-rate control section 23. The transmission-rate control section 23 changes the downlink transmission rate relative to the mobile station selected at the mobile-station selecting section 24, so as to send the changed transmission-rate information to the transmission-power control section 25. The transmission-power control section 25 in accordance with the information of the transmission rate which is sent from the transmission-rate control section 23 controls the transmission power so as to transmit a downlink signal.

Figure 3:
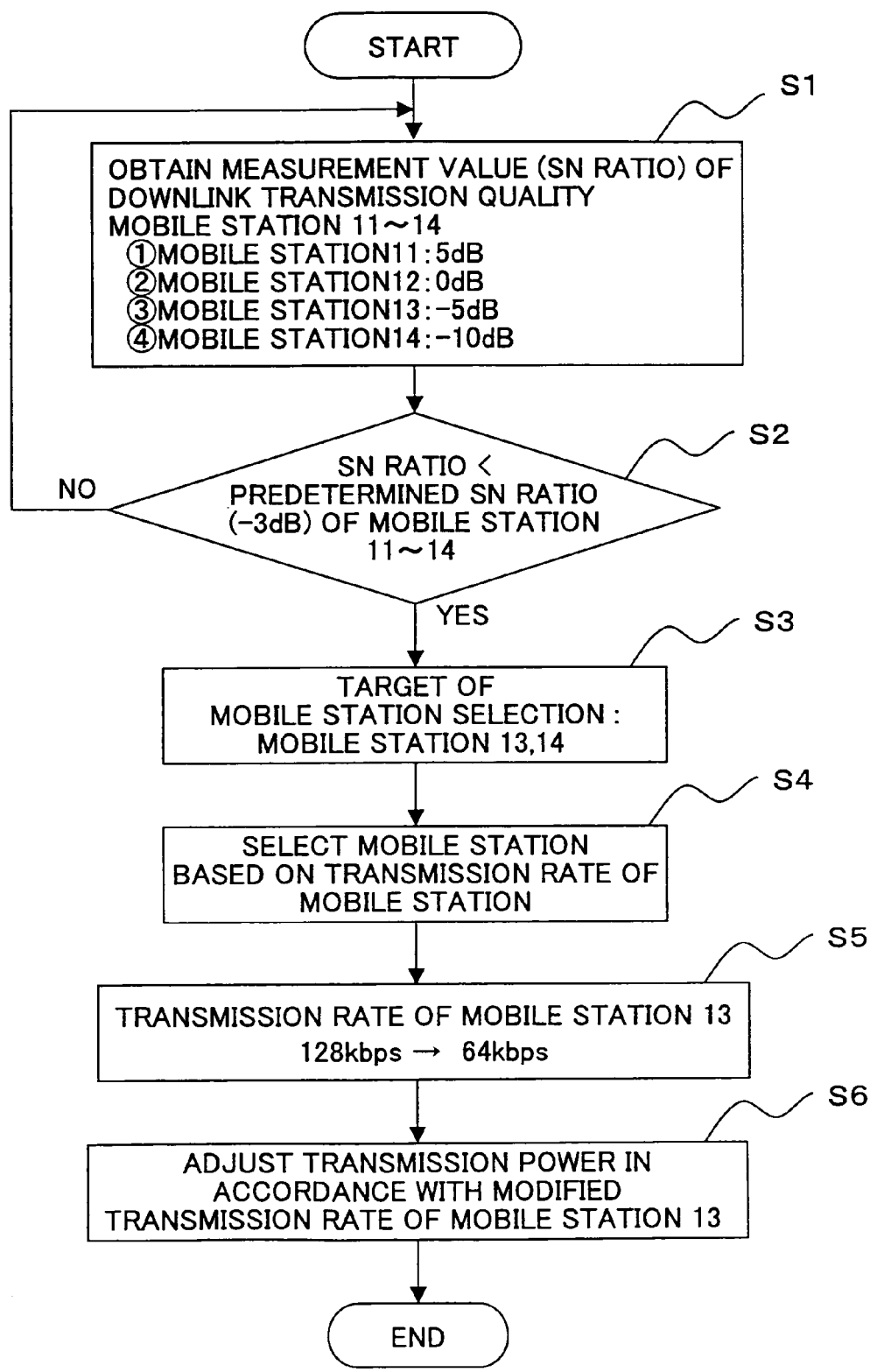
FIG. 3 is a flowchart illustrating a transmission-rate control process at the wireless controller according to the embodiment 1 of the present invention.

FIG. 3 is a flowchart illustrating a transmission-rate control process in the wireless controller 20 according to the embodiment 1 of the present invention.

In FIG. 3, the transmission-quality measuring section 21 obtains, from each of the mobile stations 11 through 14, as downlink transmission quality information, a Signal-to-Noise Ratio (below abbreviated as SN Ratio) (Step S1). For example, the SN Ratio of the downlink circuit measured at each of the mobile stations 11 through 14 is assumed as follows:

| Mobile station | Measured SN Ratio (in dBs) result of the downlink circuit |
| --- | --- |
| 1) Mobile station 11 | 5 dB |
| 2) Mobile station 12 | 0 dB |
| 3) Mobile station 13 | −5 dB |
| 4) Mobile station 14 | −10 dB |

The transmission-quality comparing section 22, upon receiving the measured value of the downlink-circuit SN Ratio from each of the mobile stations 11 through 14, compares the measured values with a predetermined transmission quality (in this case, a predetermined SN Ratio) (Step S2). Herein, assuming the predetermined SN Ratio as "−3 dB", there are 2 mobile stations with a SN Ratio below the predetermined value, the mobile station 13 (with a SN Ratio of −5 dB) and the mobile station 14 (with a SN Ratio of −10 dB) so that these are extracted as mobile-station selecting targets (YES in Step S2). In Step S2, if no mobile stations with a SN Ratio below the predetermined SN Ratio (NO in Step S2) exist, a measured value of the downlink transmission quality of each of the mobile stations 11 through 14 is obtained again, returning to Step S1.

Thus, as described in the above, the mobile stations 13 and 14 which are selecting targets extracted at the transmission-quality comparing section 22 are reported to the mobile station-selecting section 24 (Step S3) and selected according to predetermined criteria, for example, a transmission rate of the mobile station (Step S4). For example, assuming that the transmission rates of the mobile stations 13 and 14 are respectively 128 kbps and 64 kbps, the mobile station with a higher transmission rate, or the mobile station 13, is selected. Thus, when the mobile station 13 is selected at the mobile-station selecting section 24, that selected mobile station information (in this case, information indicating the mobile station 13 and information indicating the current transmission rate of the mobile station 13) is sent to the transmission-rate control section 23 so that at the transmission-rate control section 23, a control process which reduces the transmission rate of the mobile station 13 is performed (Step S5). For example, the transmission rate is lowered from 128 kbps to 64 kbps. In other words, for the downlink circuit with a notable degradation of transmission quality due to multi-path fading and the like, communications with the transmission rate kept high are wasteful, only consuming much power. Thus, when the transmission quality is degraded, the transmission rate is lowered so as to suppress the transmission volume of data, thereby reducing the transmission power.

In the transmission-power control section 25, the transmission power is adjusted in accordance with the transmission rate changed at the transmission-rate control section 23 (in this case, 64 kbps), so that a transmission of a downlink signal is performed (Step S6).

As described above, according to the present embodiment, as a mobile station having the downlink transmission quality equal to or below a certain level is selected so that the downlink transmission rate of that selected mobile station is controlled, the transmission rate is lowered for a mobile station with a low transmission efficiency relative to the amount of power consumption. In other words, there is no longer a need to oversee so as to control all of the base stations as in the related art. Therefore, a reduction of the processing burden at the time of controlling the transmission rate so as to facilitate the process of controlling others is enabled.

While in the embodiment 1 as described above, a case of selecting only one mobile station in the descending order of the transmission rate at the mobile-station selecting section 24 as a mobile station targeted for the transmission rate control is described, multiple mobile stations may be selected in the descending order of the transmission rate. For example, both mobile station 13 and mobile station 14 may be selected in that order.

Also, in the embodiment 1 as described above, while a case of the mobile-station selecting section 24 selecting a mobile station targeted for control of the transmission rate based on the transmission rate of the mobile station is described, the present invention is not limited to such selection criteria. For example, it may take a form such as to select mobile stations based on the received-quality values reported from the mobile stations. In that case, mobile stations are selected in the ascending order of the receiving quality. Also, in addition to those as described above, a selection of mobile stations may be based on the travelling speed or the arrival time (or the order) of the received quality values reported as described above, or may be selected randomly.

Further, while control of the transmission rate according to the embodiment 1 describes a case of reducing the downlink transmission rate from 128 kbps to 64 kbps, control may be performed so as to cause changes to successively lower transmission speeds (for example: 128 kbps to 64 kbps to 32 kbps).

Furthermore, in the embodiment 1, while a case of the transmission-quality measuring section 21 obtaining the downlink transmission quality reported from each of the mobile stations is described, it may take a form so that the transmission-quality measuring section 21 measures and obtains the downlink quality of transmission to the mobile stations so as to obtain the transmission quality.

(Variations)

The present invention is not limited to the above embodiment, enabling a number of variations.

Embodiment 2

Figure 4:
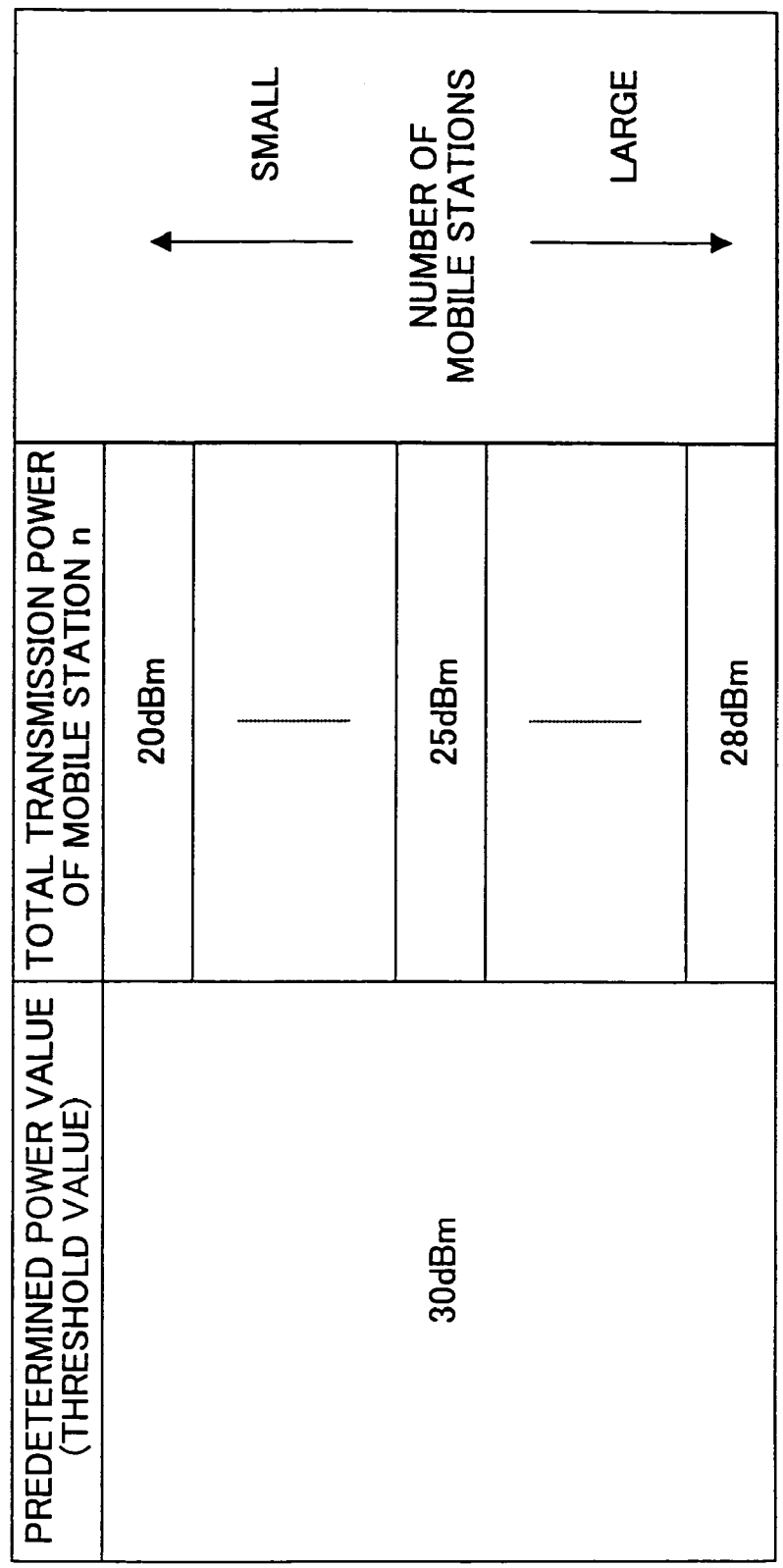
FIG. 4 illustrates one example of a transmission-power control table according to an embodiment 2 of the present invention.
Figure 6A:
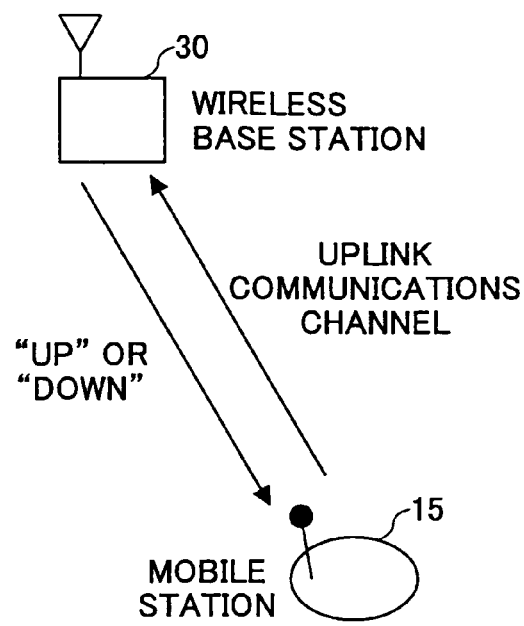
FIG. 6A is a schematic diagram illustrating the concept of closed-loop transmission power control of an uplink circuit.
Figure 6B:
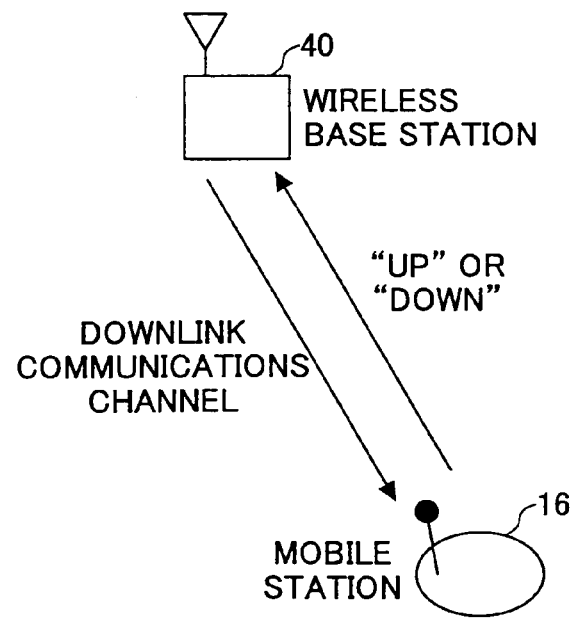
FIG. 6B is a schematic diagram illustrating the concept of closed-loop transmission power control of a downlink circuit.
Figure 7:
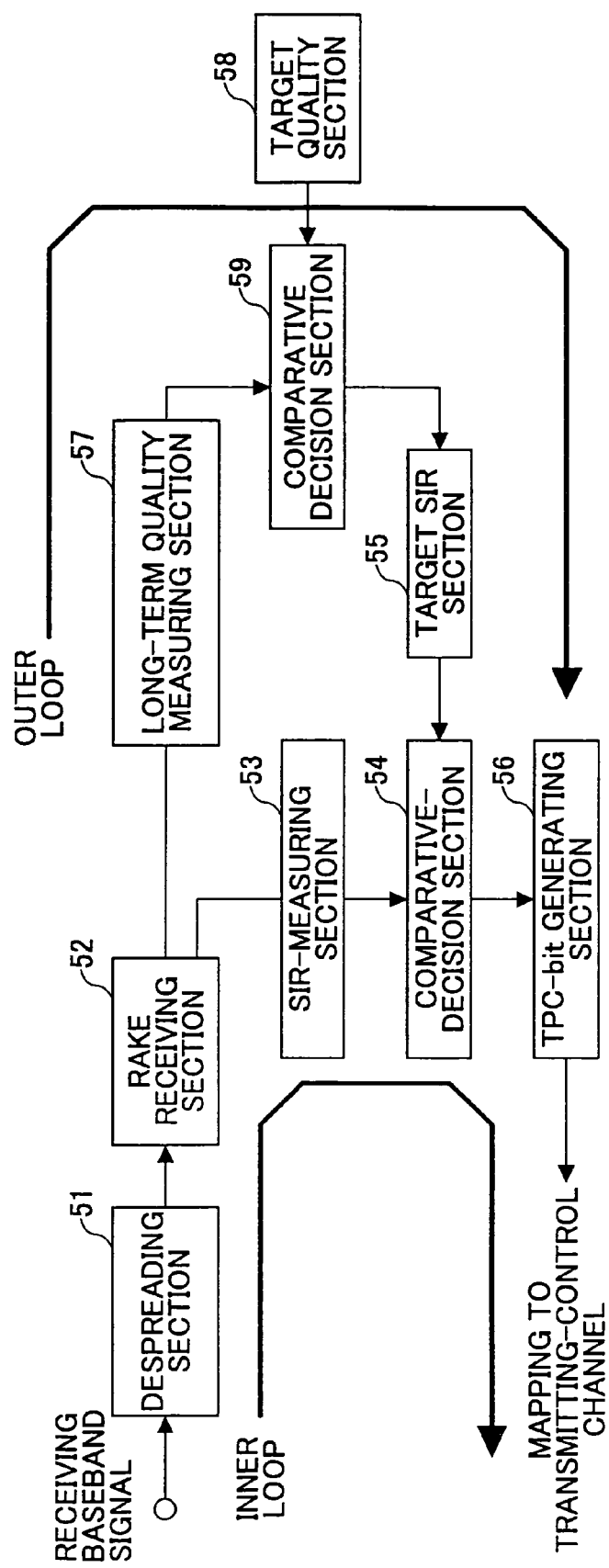
FIG. 7 is a receiving-block diagram of dual closed-loop control applied to a wireless base station and a mobile station using the WCDMA method.

FIG. 4 is a diagram illustrating one example of a transmission-power control table. The transmission-power control table as described above is referred to when the mobile-station selecting section 24 selects the number of the mobile stations. In the present embodiment 2, the mobile-station selecting section 24 when selecting a mobile station targeted for control of the transmission rate determines the number of mobile stations targeted for control of the transmission rate, determines the number of the mobile stations based on a ratio of a measured value of the total transmission power (the total transmission power of the wireless base station) relative to a predetermined power value (a threshold value). In the transmission-power control table, the ratio of the predetermined threshold value to the measured value of the total transmission power of multiple mobile stations n, and the number of mobile stations are correlated so as to be controlled. For example, in a case that the predetermined power value is 30 dBm, more mobile stations are selected when the measured value of the total transmission power is 28 dBm than when the value is 25 dBm. In other words, when the measured value of the total transmission power of the multiple mobile stations n approaches the predetermined power value, more power resources of the wireless base station are consumed; in such a case, as more mobile stations are selected, the transmission rate is lowered so as to suppress consumption of power resources of the wireless base station. Hereby, efficient use of the power resources of the wireless base station is enabled.

In the embodiment 2 as described above, while a case of determining the number of mobile stations changing the downlink transmission rate from the relationship between the measured value of the total transmission power of the multiple mobile stations and the predetermined power value is described, the present invention is not limited to this case. For example, it may take a form such that a list of mobile stations reordered in the descending order of the transmission power is controlled in the above transmission-power control table, so as to select the mobile stations up to the top m-th in terms of the transmission power depending on the measured total transmission power value of the mobile stations n.

Further, in the embodiment 1 of the present invention, while a case of selecting a mobile station with the downlink transmission quality below a predetermined quality as the mobile station targeted for transmission rate control is described, it may take a form such that a mobile station with the downlink transmission quality exceeding a predetermined quality is selected as a mobile station targeted for transmission rate control, and control so as to raise the transmission rate of that selected mobile station. Furthermore, that case is limited to a case in which there is an availability of power resources of the wireless base station.

Furthermore, it may take a form such that mode 1 and mode 2 are adaptively switched, where the mode 1 corresponds to selecting a mobile station with a good downlink transmission quality when there is relative availability of power resources, and the mode 2 corresponds to selecting a mobile station with a poor downlink transmission quality when there is no availability of power resources.

Furthermore, while a case of the wireless controller serving to control the transmission rate according to the embodiment of the present invention is described, as a matter of course, the transmission rate control as described above may be performed by the wireless base station.

Embodiment 3

FIG. 5 is a sequence diagram illustrating a transmission-rate control process according to an embodiment 3 of the present invention. In this example, MS1 (a mobile station), MS2, and MS3 respectively communicate at 128 kbps, 128 kbps, and 64 kbps, each MS measures the downlink transmission quality, and transmits a request for changing the transmission rate to a BS (a wireless base station) when a measured value of the transmission quality is less than or equal to a predetermined value. Herein, a request for change in the transmission rate as described above is included in the measured transmission quality value information reported from the MS-side. BS, upon receiving the request for change in the transmission rate from MS2, performs a control process causing a reduction of the transmission rate of MS2 (from 128 kbps to 64 kbps, in this example) so as to start the transmission of a downlink signal at the transmission power in accordance with the changed transmission rate.

According to the embodiment 3 as described above, as there is no need to select, at the BS-side, a MS targeted for transmission rate control, enabling a reduction of the processing burden related to transmission-rate control at the BS. Further, at the MS-side, as a request for change in the transmission rate (for example, activating a flag bit) is merely included in the reporting information periodically reported to BS, there is no need to newly exchange control information at a wireless term in order to cause a change in the transmission rate.

Furthermore, in the embodiment 3, while a case of performing control of the transmission rate at the BS is described, as a matter of course, the control process of the transmission rate may be performed at a high-level node of the BS.

The present application is based on Japanese Priority Patent Application No. 2003-109352 filed Apr. 14, 2003, with the Japanese Patent Office, the entire contents of which are hereby incorporated by reference.

What is claimed is:

1. A transmission controller which controls a plurality of downlink transmission rates corresponding to a plurality of communications terminals based on a plurality of downlink transmission qualities corresponding to the communications terminals, comprising:

a transmission-quality obtaining unit configured to obtain said downlink transmission qualities of said communications terminals;

a communications-terminal selecting unit configured to select out of said communications terminals one or more communications terminals for changing corresponding downlink transmission rates in accordance with said downlink transmission qualities obtained at said transmission-quality obtaining unit, said communications-terminal selecting unit configured to select at least a communications terminal having a highest downlink transmission rate among communications terminals having a transmission quality below a threshold; and a transmission-rate changing unit configured to change said one or more of the downlink transmission rates corresponding to said one or more of the communications terminals selected at said communications-terminal selecting unit.

2. The transmission controller as claimed in claim 1, wherein said transmission-quality obtaining unit further comprises:

one of a transmission-quality measuring unit configured to measure said downlink transmission qualities by said transmission-quality measuring unit itself and a transmission-quality receiving unit configured to receive said downlink transmission qualities measured by and reported from said communications terminals.

3. The transmission controller as claimed in claim 1, wherein said communications-terminal selecting unit selects, as said one or more of the communications terminals which cause to change said corresponding downlink transmission rates, at least one out of said communications terminals with corresponding downlink transmission quality falling below a predetermined quality.

4. The transmission controller as claimed in claim 2, wherein said communications-terminal selecting unit selects said one or more of the communications terminals which cause to change said corresponding downlink transmission rates based on at least one of transmission speeds corresponding to said communications terminals, traveling speeds corresponding to said communications terminals, received-quality values reported from the corresponding communications terminals, arrival times of said received-quality values reported, and arrival orders of said received-quality values reported.

5. The transmission controller as claimed in claim 2, wherein said communications-terminal selecting unit selects randomly said one or more of the communications terminals which cause to change said corresponding downlink transmission rates.

6. The transmission controller as claimed in claim 2, wherein said communications-terminal selecting unit selects said one or more of the communications terminals which cause to change said corresponding downlink transmission rates based on a plurality of ratios relative to a predetermined power value of a plurality of total-transmission power values corresponding to said communications terminals.

7. The transmission controller as claimed in claim 1, wherein said communications-terminal selecting unit is configured to select m communication terminals with the highest transmission power based on the measured total transmission power value of all of said communication terminals.

8. A wireless base station which controls a plurality of downlink transmission rates corresponding to a plurality of mobile stations based on a plurality of downlink transmission qualities corresponding to the mobile stations, comprising:

a transmission-quality obtaining unit configured to obtain said downlink transmission qualities of said mobile stations;

a mobile-station selecting unit configured to select out of said mobile stations one or more mobile stations for changing corresponding downlink transmission rates in accordance with said downlink transmission qualities obtained at said transmission-quality obtaining unit, said mobile-station selecting unit configured to select at least a mobile station having a highest downlink transmission rate among mobile stations having a transmission quality below a threshold; and a transmission-rate changing unit configured to change said one or more of the downlink transmission rates corresponding to said one or more of the mobile stations selected at said mobile-station selecting unit.

9. The wireless base station as claimed in claim 8, wherein said mobile-station selecting unit is configured to select m mobile stations with the highest transmission power based on the measured total transmission power value of all of said mobile stations.

10. A method of controlling transmission rate which controls a plurality of downlink transmission rates corresponding to a plurality of communications terminals based on a plurality of downlink transmission qualities corresponding to the communications terminals, comprising:

obtaining said downlink transmission qualities of said communications terminals;

comparing with a predetermined quality value corresponding values of said downlink transmission qualities obtained;

selecting, when at least one of said downlink transmission qualities is determined to fall below a predetermined quality, as one or more of the communications terminals which cause to change corresponding one or more of the downlink transmission rates, at least one communications terminal out of said communications terminals with corresponding downlink transmission quality falling below said predetermined quality and having a highest downlink transmission rate; and changing said downlink transmission rate of said at least one communications terminal selected.

11. The method as claimed in claim 10, wherein said selecting includes selecting m communication terminals with the highest transmission power based on the measured total transmission power value of all of said communication terminals.

* * * * *